United States Patent
Chou et al.

(10) Patent No.: US 7,729,589 B2
(45) Date of Patent: Jun. 1, 2010

(54) BACK LIGHT UNIT MOLD FRAME CONSTRUCTION

(75) Inventors: Fang-I Chou, Yangmei Taoyuan (TW); Chia-Chun Hsu, Yangmei Taoyuan (TW)

(73) Assignee: K-Bridge Electronics Co., Ltd., Yangmei Taoyuan (TW)

( * ) Notice: Subject to any disclaimer, the term of this patent is extended or adjusted under 35 U.S.C. 154(b) by 0 days.

(21) Appl. No.: 11/497,414

(22) Filed: Aug. 2, 2006

(65) Prior Publication Data
US 2007/0212007 A1    Sep. 13, 2007

(30) Foreign Application Priority Data
Mar. 8, 2006    (TW) .............................. 95203830 U

(51) Int. Cl.
G02B 6/00    (2006.01)
(52) U.S. Cl. ..................................................... 385/901
(58) Field of Classification Search ................. 385/901; 362/600, 603, 615, 632
See application file for complete search history.

(56) References Cited

U.S. PATENT DOCUMENTS

| 6,123,430 A * | 9/2000 | Ono et al. ..................... 362/608 |
| 6,435,685 B2 * | 8/2002 | Matsushita ................... 362/608 |
| 6,611,304 B2 * | 8/2003 | Itoh et al. ...................... 349/65 |
| 2005/0286008 A1 * | 12/2005 | Miyagawa et al. .......... 349/158 |

* cited by examiner

*Primary Examiner*—Sarah Song
(74) *Attorney, Agent, or Firm*—Jackson IPG PLLC

(57) ABSTRACT

A mold frame contains a lamp shade and a light source, a light guide being erected at the open end and secured in place on one side of the lamp shade; streams of light from the light source entering into from one side of the light guide plate to project in the direction as expected; and a mask device being disposed on the mold frame at where close to the joint edge of the light guide plate so to weaken the reflection rate of the light that leaves the light guide plate, to reduce the interference of the light in the light guide plate, and to diminish the phenomenon of ripples.

6 Claims, 5 Drawing Sheets

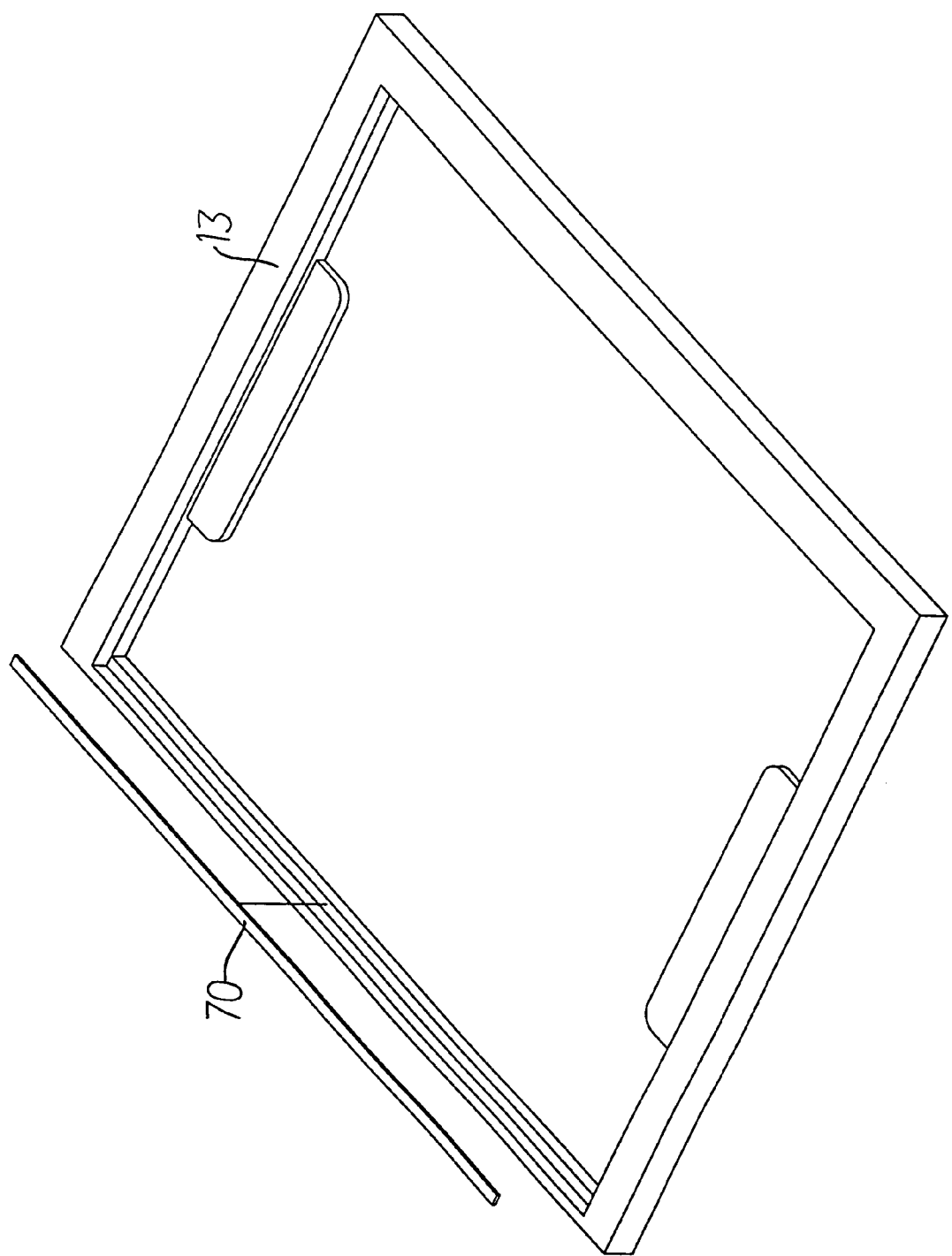

BACK LIGHT UNIT MOLD FRAME CONSTRUCTION

BACKGROUND OF THE INVENTION (a) Field of the Invention

The present invention is related to an improved construction of a mold frame, and more particularly, to one used in a blue light unit (BLU) to weaken the reflection rate of the light emitted from the light guide plate, thus to reduce the interference to the streams of light in the light guide plate while diminishing the phenomenon of ripples.

(b) Description of the Prior Art

Whereas, either direct type or edge-lighting type back light unit may be selected for an LCD applied in information system depending on the requirements of the design. Referring to FIG. 1 of the accompanying drawings for a schematic view of a basic construction of an edge-lighting back light unit, the BLU essentially has a light source 20 disposed in a lampshade 12, and has an end of a light guide plate 30 inserted to the open end of the lampshade 12. Multiple optical films 50 and an LCD panel 60 are provided in sequence on the top of the light guide plate. Streams of light emitted from the light source 20 enter from the end of the light guide plate into the light guide plate 30 and radiate towards the expected surface of the plate to achieve the display results by the LCD panel 60. Wherein, each optical film 50 is generally comprised of a lower diffusion film 51, a brightness enforcement film 52, and an upper diffusion film 51 disposed in sequence on the top of the light guide plate 30 for each optical film 50 to increase the diffusion results of the light source for delivering uniform light.

Furthermore, the entire BLU may be assembled in a mold frame 13 as illustrated in FIG. 2 for achieving the purpose of having the entire assembly secured in place. However, the mold frame is generally made of white material and could easily create interference by having the light reflected to overlap in the direction that streams of the light are advancing due to the way of reflecting the streams of light leaving the light guide plate. The main reason causing the interference is the variations of the level extent in the direction of Z axle of the white mold frame and of the polymerization of molding materials. Those variations cause the reflection ones of the streams of light leaving the light guide plate to become uneven and result in overlapped interference. The interference when displayed on the light emitting surface forms ripples.

SUMMARY OF THE INVENTION

The primary purpose of the present invention is to provide an improved construction of a mold frame used in a back light unit to correct the ripples found with the prior art and to improve the display quality of the back light unit.

To achieve the purpose, the present invention is essentially comprised of a mold frame disposed with a lampshade and a light source, a light guide plate is inserted onto the open end of the lampshade and secured on one side of the lampshade; streams of light from the light source enters from one side of the light guide plate so to allow the streams of light emitted from the light source to project in the expected direction. A mask device is disposed on the mold frame at where close to the joint edge of the light guide plate to weaken the reflection rate of streams light leaving the light guide plate, reduce the interference of streams of light in the light guide plate, and diminish phenomenon of ripples.

BRIEF DESCRIPTION OF THE DRAWINGS

FIG. 5 is another perspective view showing a construction of the mold frame and a mask device of the present invention.

DETAILED DESCRIPTION OF THE PREFERRED EMBODIMENTS

Figure 1:
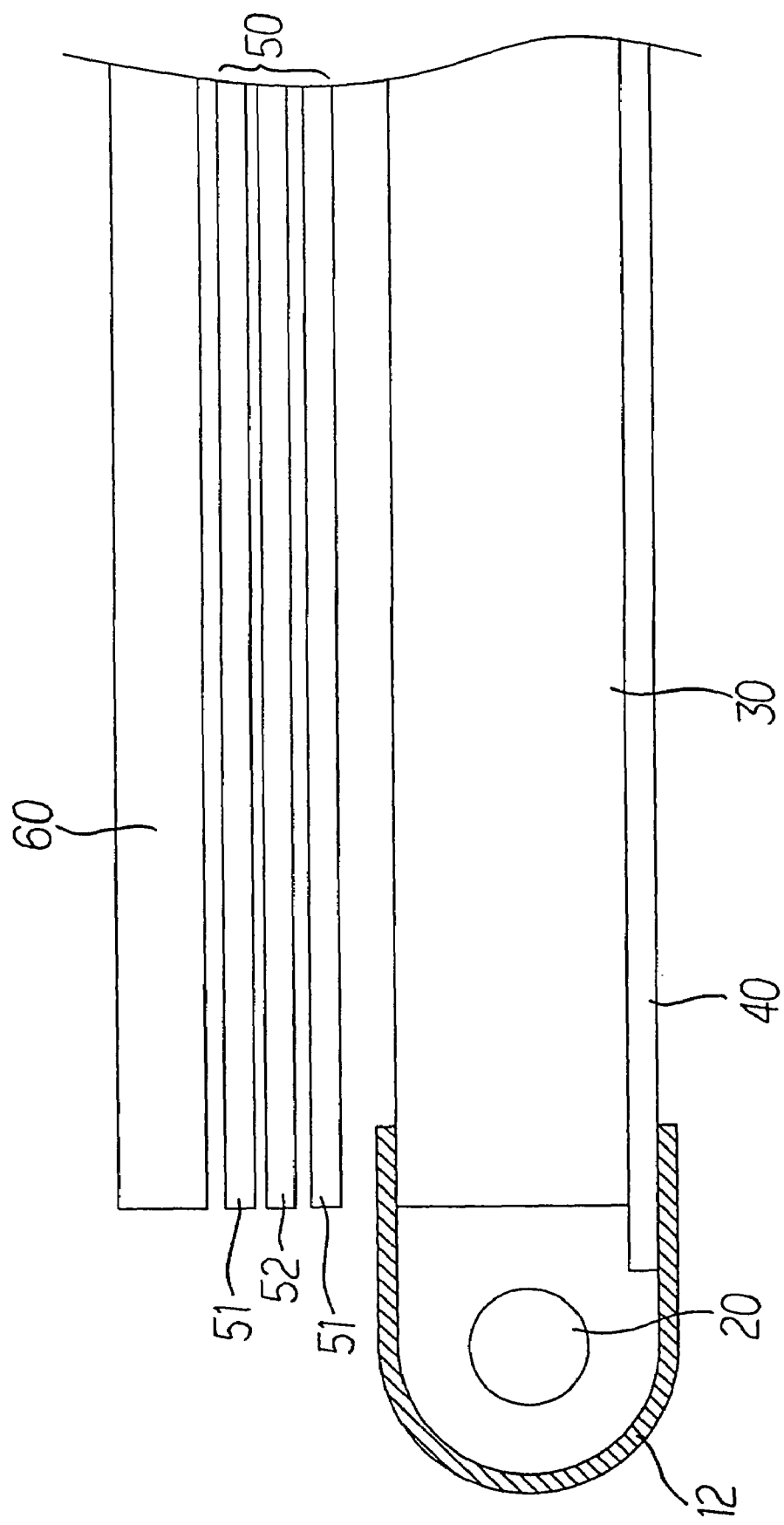
FIG. 1 is a schematic view showing a construction of a mold frame in an edge-lighting back light unit of the prior art.
Figure 2:
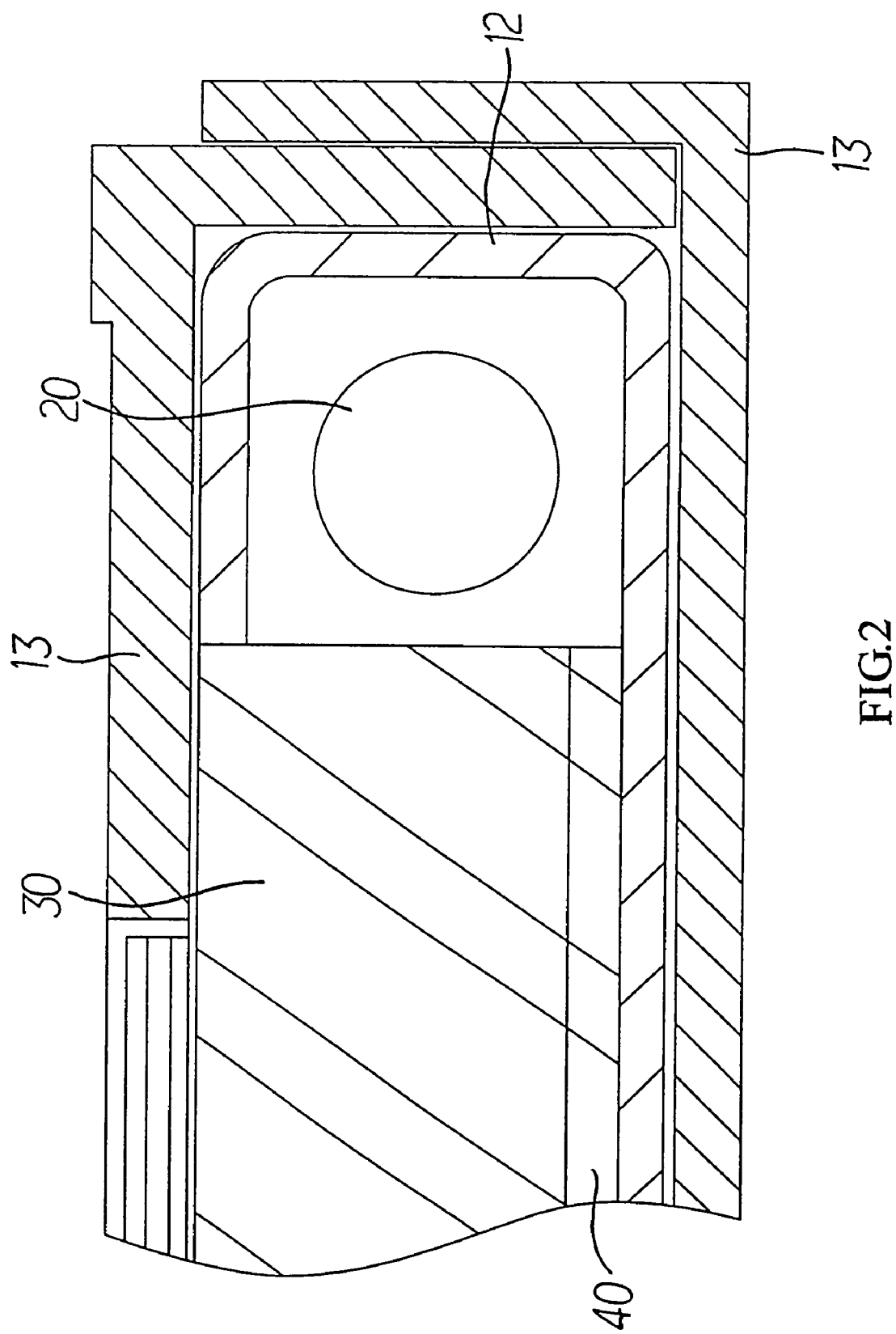
FIG. 2 is a schematic view showing a construction of a back light unit assembled in a mold frame of the prior art.
Figure 3:
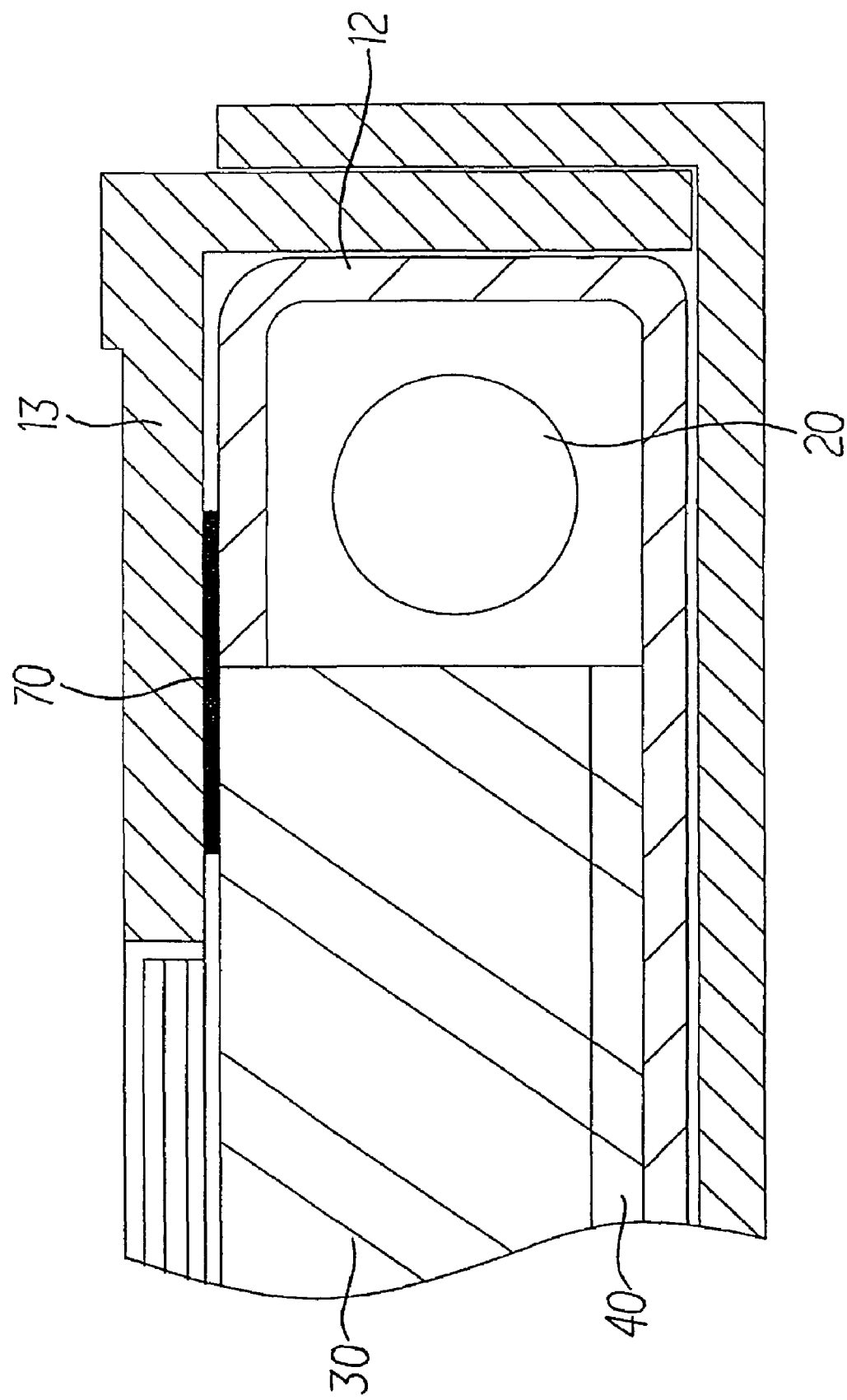
FIG. 3 is a schematic view showing a construction of a back light unit assembled in a mold frame of the present invention.

Similar to that as illustrated in FIG. 1, a basic construction of an edge lighting back light unit of a mold frame used in a back light unit of the present invention also has a light source 20 disposed in a lampshade 12 and a light guide plate 30 inserted with its edge into an open end of the lampshade 12 while multiple optical films 50 and an LCD panel 60 are disposed in sequence on top of the light guide plate 30. A reflection film 40 is also disposed below the light guide plate 30 so to allow the streams of light emitted from the light source 20 to enter into the light guide plate and leave for the expected panel surface by the light guide plate 30 to achieve the display results by the LCD panel 60. The entire back light unit may be assembled in the mold frame 13 as illustrated in FIG. 3 to achieve the purpose of securing the entire assembly in position.

Figure 4:
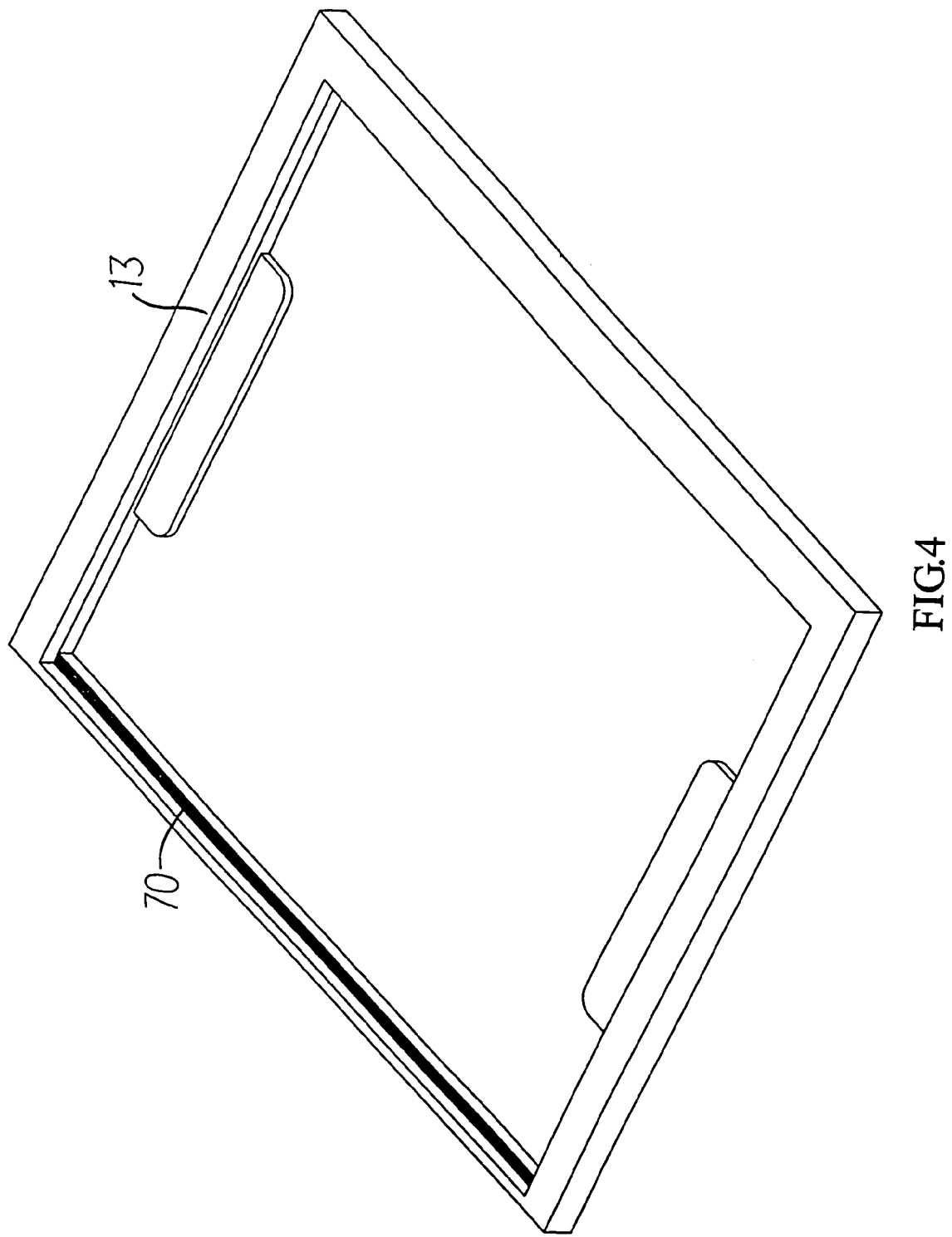
FIG. 4 is a perspective view showing a construction of the mold frame and a mask device of the present invention.

A mask device 70 is disposed on the mold frame 13 at where close to the joint edge of the light guide plate 30. The mast device may be related to a black light absorption material applied on the mold frame 13 as illustrated in FIG. 4. The disposition of the black light absorption material changes the level extent of the mold frame in the direction of its Z axle, and readjusts the polymerization variations of the molded materials so to weaken the reflection rate of the light leaving the light guide plate, reduce the interference of streams of light in the light guide plate, and diminish phenomenon of ripples for improving the display quality of the back light unit.

Alternatively, the mask device 70 may be related to an adhesive tape with various colors to be attached to the mold frame 13 as illustrated in FIG. 5 to achieve the same purpose of diminishing phenomenon of ripples.

The prevent invention provides an improved structure of a mold frame in a back light unit, and the application for a utility patent is duly filed accordingly. However, it is to be noted that the preferred embodiments disclosed in the specification and the accompanying drawings are not limiting the present invention; and that any construction, installation, or characteristics that is same or similar to that of the present invention should fall within the scope of the purposes and claims of the present invention.

We claim:

1. A back light unit mold frame comprising: a lampshade; a mold frame; and a light source; a light guide plate being inserted onto an open end of the lampshade and secured on one side of the lampshade; streams of light emitted from the light source entering from one side of the light guide plate; the streams of light from the light source projecting in an expected direction; a mask device having a first surface engaging the mold frame and a second surface engaging the light guide plate and the one side of the lampshade to weaken the reflection rate of the light that leaves the light guide plate, to reduce the interference of the light in the light guide plate, and to diminish a phenomenon of ripples.

2. The back light unit mold frame as claimed in claim 1, wherein the mask device is made of a black light absorption material.

3. The back light unit mold frame as claimed in claim 1, wherein the mask device is applied onto the mold frame.

4. The back light unit mold frame as claimed in claim 1, wherein the mask device is an adhesive tape attached to the mold frame.

5. The back light unit mold frame as claimed in claim 4, wherein the adhesive tape has various colors.

6. The back light unit mold frame as claimed in claim 1, wherein a reflection film is disposed below the light guide plate.

* * * * *